E. Baker,
Rock Drill.

N° 49,065.   Patented Aug. 1, 1865.

Witnesses.

Inventor.

UNITED STATES PATENT OFFICE.

ELIAS BAKER, OF PITTSBURG, PENNSYLVANIA.

IMPROVEMENT IN OIL-WELL DRILLS.

Specification forming part of Letters Patent No. 49,065, dated August 1, 1865.

*To all whom it may concern:*

Be it known that I, ELIAS BAKER, of Pittsburg, in the county of Allegheny and State of Pennsylvania, have invented a new and useful Improvement in Drills for Oil and other Wells; and I do hereby declare that the following is a full, clear, and exact description thereof, which will enable those skilled in the art to make and use the same, reference being had to the accompanying drawings, forming part of this specification, in which—

Figure 1:
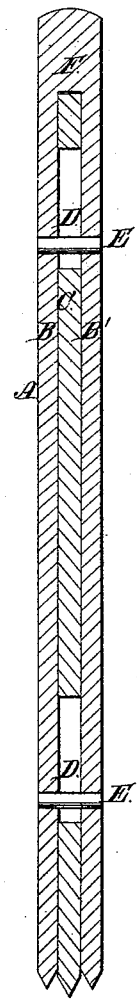
Figure 2:
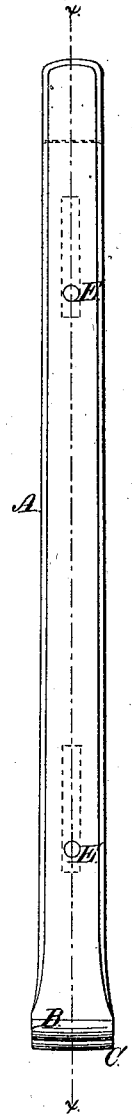
Figure 3:
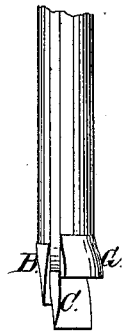

Figure 1 is a longitudinal cross-section of a drill made according to my invention, the line of section being seen at *x*, Fig. 2. Fig. 2 is a side elevation of the drill. Fig. 3 shows a modification in which one of the cutter-stocks is formed into a reamer.

Similar letters of reference indicate corresponding parts.

This invention consists in making a drill for boring wells of fast and movable cutters combined together in one stock in such a way that the movable cutter will be the leading cutter, and after it has made its stroke will receive a blow on its end from the descent of the fast cutters, thereby driving it past them into the rock.

A designates the drill, composed in this example of my invention of two fixed cutters, B B, connected to each other by stout bolts or rivets E, and of one movable cutter, C, placed between the cutters B B, and capable of vertical motion. The upper part of the drill-stock is made solid at F, the part F limiting the motion of the stock or shank of the cutter C in that direction, and serving also the purpose of a hammer to the cutter C, as hereinafter explained.

D D are slots made in the stock of the cutter C, in those parts of it which are pierced by the bolts E. The length of the slots is such as to permit the cutter C to move outward a sufficient distance for practical purposes from between the cutters B, and the width of the slots is only about equal to the diameter of the bolts, so that the inner cutter shall not have lateral motion, but will be properly guided up and down by means of the bolts. The length of the faces of the three cutters here shown is about equal, being also greater than the length of the diameter of the stock of the drill; and the face of the cutter C extends a little beyond the faces of the other cutters, even when the upper end of its stock is in contact with the solid head F. This construction makes the center cutter a leading one, and its action will be to spalt or split and chip the rock before the other cutters. In the operation of boring a well, when the drill A is raised for a new blow the movable cutter C will drop down as far as is permitted by the slots D. When the drill descends for another blow the advanced cutter C will strike first and penetrate the rock. The others, falling afterward on each side of the other cutter, will be enabled to break or cut the rock much easier; and, besides, by the time the cutters B reach their lowest position on each side of the other cutter the solid head F will strike the end of the stock of the inside cutter, after the manner of a hammer, striking an effective blow, and driving it farther forward into the rock. More than one movable cutter may be used in this manner, if desired.

In Fig. 3 I have shown a modification of my drill, in which one of the cutter-stocks is formed into a reamer, G, whose office is to ream out the sides of the bore as the drill cuts its way into the rock. Both side cutters may be changed or formed in this way into reamers, if desired, leaving the central cutter to break up the rock. The blow upon the top of the central cutter will be the same whether this modification is made use of or not.

I claim as new and desire to secure by Letters Patent—

1. A drill for boring oil or other deep wells, constructed of a series of flat or chisel-shaped cutters, one or more of which are movable up and down past the other cutters or cutting-faces of the drill, substantially as and for the purpose above described.

2. So constructing a drill having both fixed and movable cutting-faces as that the head of the main drill-stock shall, on its descent, deliver a blow on the stocks of the movable cutters, substantially as and for the purpose above described.

3. Forming a reamer on the end of one or both of the stocks B B' of the drill, substantially as above described.

ELIAS BAKER.

Witnesses:
D. W. C. BIDWELL,
H. MILLINGAR.